(12) United States Patent
Hwang et al.

(10) Patent No.: US 9,574,639 B2
(45) Date of Patent: Feb. 21, 2017

(54) PLANETARY GEAR TRAIN OF AUTOMATIC TRANSMISSION FOR VEHICLE

(71) Applicant: Hyundai Motor Company, Seoul (KR)

(72) Inventors: Seongwook Hwang, Gunpo-si (KR); Won-jun Sung, Seoul (KR); Jaechang Kook, Hwaseong-si (KR); Wonmin Cho, Hwaseong-si (KR); Myeonghoon Noh, Seongnam-si (KR); Seongwook Ji, Ansan-si (KR); Kangsoo Seo, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 139 days.

(21) Appl. No.: 14/559,885

(22) Filed: Dec. 3, 2014

(65) Prior Publication Data

US 2016/0084355 A1    Mar. 24, 2016

(30) Foreign Application Priority Data

Sep. 23, 2014    (KR) .......... 10-2014-0126791

(51) Int. Cl.
*F16H 3/66* (2006.01)

(52) U.S. Cl.
CPC .......... *F16H 3/66* (2013.01); *F16H 2200/0069* (2013.01); *F16H 2200/0082* (2013.01); *F16H 2200/2012* (2013.01); *F16H 2200/2046* (2013.01)

(58) Field of Classification Search
CPC ............ F16H 3/66; F16H 2200/0069; F16H 2200/2012; F16H 2200/2046

USPC .................................... 475/275, 284
See application file for complete search history.

(56) References Cited

U.S. PATENT DOCUMENTS

| 8,303,454 | B1 * | 11/2012 | Shim ................. | F16H 3/66 475/280 |
|---|---|---|---|---|
| 2010/0210393 | A1 | 8/2010 | Phillips et al. | |
| 2013/0072342 | A1 * | 3/2013 | Shim ................. | F16H 3/66 475/276 |
| 2013/0072343 | A1 * | 3/2013 | Shim ................. | F16H 3/66 475/276 |

FOREIGN PATENT DOCUMENTS

| JP | 2008-215413 A | 9/2008 |
| JP | 2009-79711 A | 4/2009 |
| JP | 5479518 B2 | 4/2014 |
| JP | 2014-105850 A | 6/2014 |
| KR | 10-1002528 B1 | 12/2010 |
| KR | 10-1317142 B1 | 10/2013 |
| KR | 10-1416108 B1 | 7/2014 |

\* cited by examiner

*Primary Examiner* — Jacob S Scott
(74) *Attorney, Agent, or Firm* — Morgan, Lewis & Bockius LLP

(57) ABSTRACT

A planetary gear train may include an input shaft into which power of an engine may be input, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, and a fourth planetary gear set including a fourth sun gear, a fourth planetary carrier, and a fourth ring gear, and first to eighth rotational shafts.

4 Claims, 3 Drawing Sheets

FIG. 2

|      | B1 | B2 | C1 | C2 | C3 | C4 | gear ratio |
|------|----|----|----|----|----|----|------------|
| 1st  |    | O  | O  |    |    | O  | 5.689      |
| 2nd  | O  | O  |    |    |    | O  | 3.130      |
| 3nd  |    | O  |    | O  |    | O  | 1.842      |
| 4th  | O  |    |    | O  |    | O  | 1.434      |
| 5th  |    |    |    | O  | O  | O  | 1.000      |
| 6th  | O  |    |    | O  | O  |    | 0.838      |
| 7th  |    | O  |    | O  | O  |    | 0.775      |
| 8th  | O  | O  |    |    | O  |    | 0.698      |
| 9th  |    | O  | O  |    | O  |    | 0.656      |
| 10th | O  |    | O  |    | O  |    | 0.561      |
| Rev  | O  |    | O  |    |    | O  | -4.406     |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2014-0126791 filed on Sep. 23, 2014, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle that improves power delivery performance and fuel economy.

Description of Related Art

In recent years, a rise in oil price causes dashing into unlimited competition for enhancing fuel efficiency.

As a result, researches into reduction of a weight and the enhancement of the fuel efficiency through down sizing are conducted in the case of an engine and researches for simultaneously securing operability and fuel efficiency competitiveness through multistages are conducted in the case of an automatic transmission.

However, in the automatic transmission, as a gear stage increases, the number of internal components increases, and as a result, mountability, cost, weight, transmission efficiency, and the like may still deteriorate.

Accordingly, development of a planetary gear train which may bring about maximum efficiency with a small number of components may be important in order to increase a fuel efficiency enhancement effect through the multistages.

In this aspect, in recent years, 8 and 9-speed automatic transmissions tend to be implemented and the research and development of a planetary gear train capable of implementing more transmission steps has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that implements ten forward speed and one reverse speed with a minimum configuration and reduces drag torque by minimizing non-operated friction elements while three friction elements operate in respective gear stages to improve power transmission performance and fuel efficiency.

A planetary gear train of an automatic transmission for a vehicle according to an aspect of the present invention may include an input shaft into which power of an engine is input, a first planetary gear set including a first sun gear, a first planetary carrier, and a first ring gear, a second planetary gear set including a second sun gear, a second planetary carrier, and a second ring gear, a third planetary gear set including a third sun gear, a third planetary carrier, and a third ring gear, a fourth planetary gear set including a fourth sun gear, a fourth planetary carrier, and a fourth ring gear, a first rotational shaft including the second sun gear and directly connected to the input shaft, a second rotational shaft including the second planet carrier, a third rotational shaft including the first planet carrier and the second ring gear and selectively connected to a transmission housing, a fourth rotational shaft including the first sun gear and selectively connected to the transmission housing or the second rotational shaft, a fifth rotational shaft including the first ring gear and the third ring gear and selectively connected to the second rotational shaft, a sixth rotational shaft including the third planet carrier and the fourth ring gear and selectively connected to the first rotational shaft, a seventh rotational shaft including the fourth planet carrier and directly connected to an output shaft, and an eighth rotational shaft including the third sun gear and the fourth sun gear and selectively connected to the first rotational shaft.

Each of the first, second, third, and fourth planetary gear sets may be a single pinion planetary gear set.

The first, second, third, and fourth planetary gear sets may be sequentially disposed from the engine side.

The planetary gear train may further include a first clutch selectively connecting the second rotational shaft with the fourth rotational shaft, a second clutch selectively connecting the second rotational shaft with the fifth rotational shaft, a third clutch selectively connecting the input shaft with the sixth rotational shaft, a fourth clutch selectively connecting the input shaft with the eighth rotational shaft, a first brake selectively connecting the fourth rotational shaft with the transmission housing, and a second brake selectively connecting the third rotational shaft with the transmission housing.

A first forward speed may be achieved by operating the second brake and the first and fourth clutches, a second forward speed may be achieved by operating the first and second brakes and the fourth clutch, a third forward speed may be achieved by operating the second brake and the second and fourth clutches, a fourth forward speed may be achieved by operating the first brake and the second and fourth clutches, a fifth forward speed may be achieved by operating the second, third, and fourth clutches, a sixth forward speed may be achieved by operating the first brake and the second and third clutches, a seventh forward speed may be achieved by operating the second brake and the second and third clutches, an eighth forward speed may be achieved by operating the first and second brakes and the third clutch, a ninth forward speed may be achieved by operating the second brake and the first and third clutches, a tenth forward speed may be achieved by operating the first brake and the first and third clutches, and a reverse speed may be achieved by operating the first brake and the first and fourth clutches.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of gear stages of respective friction elements applied to the planetary gear train according to an exemplary embodiment of the present invention.

Figure 1:
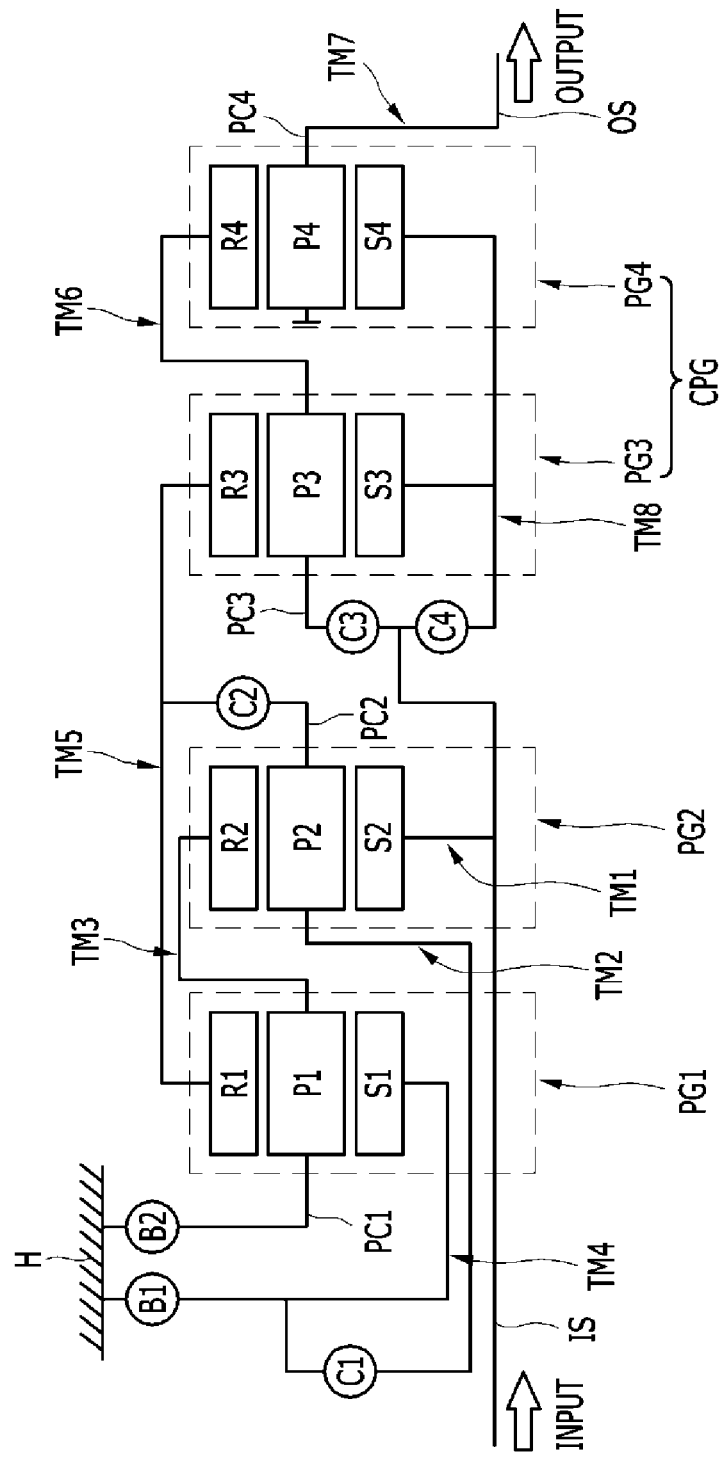
FIG. 1 is a configuration diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, parts which are not related with the description are omitted for clearly describing the exemplary embodiment of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a configuration diagram of a planetary gear train according to an exemplary embodiment of the present invention.

Referring to FIG. 1, the planetary gear train according to the exemplary embodiment of the present invention includes an input shaft IS, first, second, third, and fourth planetary gear sets PG1, PG2, PG3, and PG4 disposed on a line of the input shaft IS, an output shaft OS, eight rotational shafts TM1 to TM8 that directly connect respective rotation elements of the first, second, third, and fourth planetary gear sets PG1, PG2, PG3, and PG4 to each other, six friction elements C1 to C4 and B1 and B2, and a transmission housing H.

As a result, rotational power input from the input shaft IS is transmitted by an inter-complementation operation of the first, second, third, and fourth planetary gear sets PG1, PG2, PG3, and PG4 to be output through the output shaft OS.

In addition, the respective simple planetary gear sets are disposed in the order of the first, second, third, and fourth planetary gear sets PG1, PG2, PG3, and PG4 from an engine side.

The input shaft IS is an input member and rotational power from a crankshaft (not illustrated) of an engine (not illustrated) is torque-converted through a torque converter (not illustrated) to be input into the input shaft IS.

The output shaft OS is an output member and transmits driving power to a driving wheel through a differential apparatus.

The first planetary gear set PG1 as a single-pinion planetary gear set includes a first sun gear S1, a first planetary carrier PC1 that rotatably supports a first pinion P1 which outer-engages with the first sun gear S1, and a first ring gear R1 which inner-engages with the first pinion P1 as rotation elements.

The second planetary gear set PG2 as a single-pinion planetary gear set includes a second sun gear S2, a second planetary carrier PC2 that rotatably supports a second pinion P2 which outer-engages with the second sun gear S2, and a second ring gear R2 which inner-engages with the second pinion P2.

The third planetary gear set PG3 as the single-pinion planetary gear set includes a third sun gear S3, a third planetary carrier PC3 that rotatably supports a third pinion P3 which outer-engages with the third sun gear S3, and a third ring gear R3 which inner-engages with the third pinion P3.

The fourth planetary gear set PG4 as the single-pinion planetary gear set includes a fourth sun gear S4, a fourth planetary carrier PC4 that rotatably supports a fourth pinion P4 which outer-engages with the fourth sun gear S4, and a fourth ring gear R4 which inner-engages with the fourth pinion P4.

In the first, second, third, and fourth planetary gear sets PG1, PG2, PG3, and PG4, one or more rotation elements are directly connected to each other to operate with a total of eight rotational shafts TM1 to TM8.

Configurations of the eight rotational shafts TM1 to TM8 will be described below.

The first rotational shaft TM1 includes the second sun gear S2 and is directly connected to the input shaft IS so as to be continuously operated as an input element.

The second rotational shaft TM2 includes the second planet carrier PC2.

The third rotational shaft TM3 includes the first planet carrier PC1 and the second ring gear R2, and is selectively connected to a transmission housing H so as to be operated as a selective fixed element.

The fourth rotational shaft TM4 includes the first sun gear S1, and is selectively connected to the second rotational shaft TM2 or is selectively connected to the transmission housing H so as to be operated as a selective fixed element.

The fifth rotational shaft TM5 includes the first ring gear R1 and the third ring gear R3, and is selectively connected to the second rotational shaft TM2.

The sixth rotational shaft TM6 includes the third planet carrier PC3 and the fourth ring gear R4, and is selectively connected to the input shaft IS so as to be operated as a selective input element.

The seventh rotational shaft TM7 includes the fourth planet carrier PC4 and is directly connected to the output shaft OS so as to be operated as a final output element.

The eighth rotational shaft TM8 includes the third sun gear S3 and the fourth sun gear S4, and is selectively connected to the input shaft IS so as to be operated as a selective input element.

In addition, among the rotational shafts TM1 to TM8, four clutches C1, C2, C3, and C4 which are friction elements are disposed at the input shaft IS or portions where the rotational shafts are selectively connected to each other.

Further, among the rotational shafts TM1 to TM8, two brakes B1 and B2 which are the friction elements are disposed at portions selectively connected to the transmission housing H.

The first clutch C1 is interposed between the second rotational shaft TM2 and the fourth rotational shaft TM4, and selectively connects the second rotational shaft TM2 with the fourth rotational shaft TM4.

The second clutch C2 is interposed between the second rotational shaft TM2 and the fifth rotational shaft TM5, and selectively connects the second rotational shaft TM2 with the fifth rotational shaft TM5.

The third clutch C3 is interposed between the input shaft IS and the sixth rotational shaft TM6, and selectively connects the input shaft IS with the sixth rotational shaft TM6.

The fourth clutch C4 is interposed between the input shaft IS and the eighth rotational shaft TM8, and selectively connects the input shaft IS with the eighth rotational shaft TM8.

The first brake B1 is interposed between the fourth rotational shaft TM4 and the transmission housing H, and causes the fourth rotational shaft TM4 to be operated as the selective fixed element.

The second brake B2 is interposed between the third rotational shaft TM3 and the transmission housing H, and causes the third rotational shaft TM3 to be operated as the selective fixed element.

The respective friction elements constituted by the first, second, third, and fourth clutches C1, C2, C3, and C4 and the first and second brakes B1 and B2 as described above may be configured by multiple-disk hydraulic friction joining units which are friction-joined by hydraulic pressure.

FIG. 2 is an operation table for each of gear stages of respective friction elements applied to the planetary gear train according to an exemplary embodiment of the present invention.

As illustrated in FIG. 2, in the planetary gear train according to an exemplary embodiment of the present invention, while three friction elements operate in the respective gear stages, a transmission is performed.

The second brake B2 and the first and fourth clutches C1 and C4 are operated at a first forward speed 1st.

The first and second brakes B1 and B2 and the fourth clutch C4 are operated at a second forward speed 2nd.

The second brake B2 and the second and fourth clutches C2 and C4 are operated at a third forward speed 3rd.

The first brake B1 and the second and fourth clutches C2 and C4 are operated at a fourth forward speed 4th.

The second, third, and fourth clutches C2, C3, and C4 are operated at a fifth forward speed 5th.

The first brake B1 and the second and third clutches C2 and C3 are operated at a sixth forward speed 6th.

The second brake B2 and the second and third clutches C2 and C3 are operated at a seventh forward speed 7th.

The first and second brakes B1 and B2 and the third clutch C3 are operated at an eighth forward speed 8th.

The second brake B2 and the first and third clutches C1 and C3 are operated at a ninth forward speed 9th.

The first brake B1 and the first and third clutches C1 and C3 are operated at a tenth forward speed 10th.

The first brake B1 and the first and fourth clutches C1 and C4 are operated at a reverse speed Rev.

Figure 3:
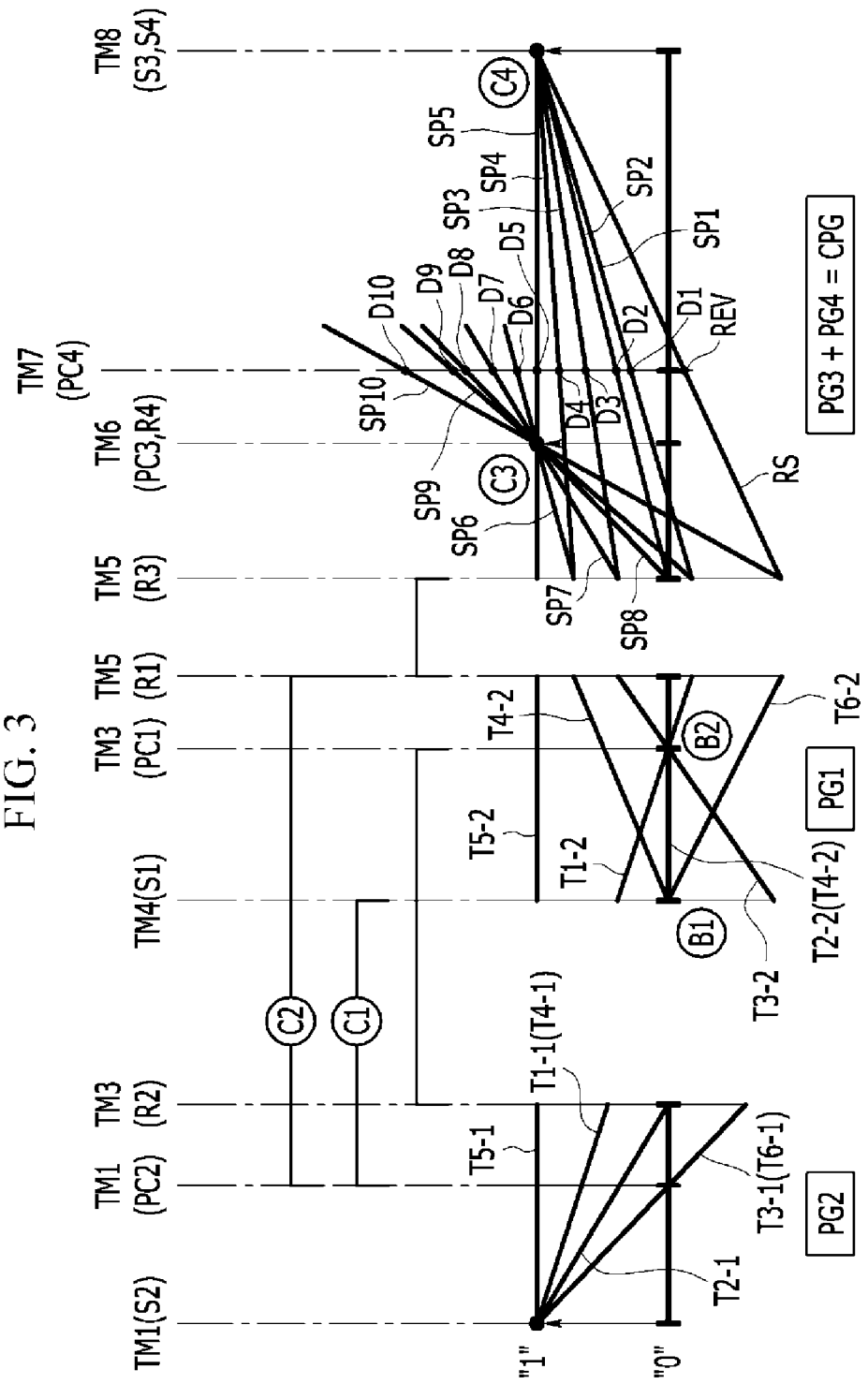
FIG. 3 is a lever diagram of a planetary gear train according to an exemplary embodiment of the present invention.

FIG. 3 is a lever diagram of a planetary gear train according to an exemplary embodiment of the present invention. A transmission process of the planetary gear train according to the exemplary embodiment of the present invention is illustrated through a lever analysis method.

Referring to FIG. 3, three vertical lines of the second planetary gear set PG2 are set as the first rotational shaft TM1, the second rotational shaft TM2, and the third rotational shaft TM3 from the left, three vertical lines of the first planetary gear set PG1 are set as the fourth rotational shaft TM4, the third rotational shaft TM3, and the fifth rotational shaft TM5 from the left, and four vertical lines of a compound planetary gear set CPG formed by combining the third and fourth planetary gear sets PG3 and PG4 are set as the fifth rotational shaft TM5, the sixth rotational shaft TM6, the seventh rotational shaft TM7, and the eighth rotational shaft TM8 from the left.

In addition, a lower horizontal line represents rotation speed of "0", and an upper horizontal line represents rotation speed of "1", that is the same rotation speed as the input shaft IS.

Intervals between the vertical lines are set according to each gear ratio (the teeth number of sun gear/the teeth number of ring gear) of each of the planetary gear sets PG1 to PG4.

Further, since setting of a rotational axis of the vertical line which is set by inter-combinations of the planetary gear sets is, of course, known to those skilled in the art of the planetary gear train, a detailed description thereof will be omitted.

Hereinafter, the transmission process for each gear stage of the planetary gear train according to the exemplary embodiment of the present invention will be described with reference to FIGS. 2 and 3.

The first planetary gear set PG1 and the second planetary gear set PG2 changes rotation speed input through the first rotational shaft TM1 into six speeds by operation of the first and second clutches C1 and C2 and the first and second brakes B1 and B2, and outputs the six speeds through the fifth rotational shaft TM5.

In addition, the compound planetary gear set CPG including the third and fourth planetary gear sets PG3 and PG3 outputs ten forward speeds and one reverse speed through the seventh rotational shaft TM7 that is the final output member by using the six speeds input through the fifth rotational shaft TM5 and torque input through the sixth rotational shaft TM6 or the eighth rotational shaft TM8.

In a state that rotation speed of the input shaft IS is input to the first rotational shaft TM1, the first planetary gear set PG1 and the second planetary gear set PG2 form six speed lines by operation of the frictional elements.

First forward speed lines T1-1 and T1-2 are formed when the first clutch C1 and the second brake B2 are operated, and are involved in the first forward speed and the ninth forward speed.

Second forward speed lines T2-1 and T2-2 are formed when the first brake B1 and the second brake B2 are operated, and are involved in the second forward speed and the eighth forward speed.

Third forward speed lines T3-1 and T3-2 are formed when the second clutch C2 and the second brake B2 are operated, and are involved in the third forward speed and the seventh forward speed.

Fourth forward speed lines T4-1 and T4-2 are formed when the second clutch C2 and the first brake B1 are operated, and are involved in the fourth forward speed and the sixth forward speed.

Fifth forward speed lines T5-1 and T5-2 are formed when the second clutch is operated, and are involved in the fifth forward speed.

Sixth forward speed lines T6-1 and T6-2 are formed when the first clutch C1 and the first brake B1 are operated, and are involved in the tenth forward speed and the reverse speed.

Hereinafter, the transmission process for each gear stage of the planetary gear train according to the exemplary embodiment of the present invention will be described.

[First Forward Speed]

Referring to FIG. 2, the second brake B2 and the first and fourth clutches C1 and C4 are operated at the first forward speed 1st.

As shown in FIG. 3, the first and second planetary gear sets PG1 and PG2 form the first forward speed lines T1-1 and T1-2 by operation of the first clutch C1 and the second brake B2, and corresponding rotation speed is input to the compound planetary gear set CPG through the fifth rotational shaft TM5.

In addition, in a state that the corresponding rotation speed (inverse rotation speed) is input to the fifth rotational shaft TM5, the rotation speed of the input shaft IS is input to the eighth rotational shaft TM8 by operation of the fourth clutch C4. Therefore, the compound planetary gear set CPG1 form a first shift line SP1 and D1 is output through the seventh rotational shaft TM7.

[Second Forward Speed]

The first clutch C1 that was operated at the first forward speed is released and the first brake B1 is operated at the second forward speed 2nd.

As shown in FIG. 3, the first and second planetary gear sets PG1 and PG2 form the second forward speed lines T2-1 and T2-2 by operation of the first and second brakes B1 and B2, and all of the rotational elements of the second planetary gear set PG2 are fixed.

In a state that the fifth rotational shaft TM5 is fixed, the rotation speed of the input shaft IS is input to the eighth rotational shaft TM8 by operation of the fourth clutch C4. Therefore, the compound planetary gear set CPG1 form a second shift line SP2 and D2 is output through the seventh rotational shaft TM7 that is the output element.

[Third Forward Speed]

The first brake B1 that was operated at the second forward speed is released and the second clutch C2 is operated at the third forward speed 3rd.

As shown in FIG. 3, the first and second planetary gear sets PG1 and PG2 form the third forward speed lines T3-1 and T3-2 by operation of the second clutch C2 and the second brake B2, and corresponding rotation speed is input to the compound planetary gear set CPG through the fifth rotational shaft TM5.

In a state the corresponding rotation speed is input to the fifth rotational shaft TM5, the rotation speed of the input shaft IS is input to the eighth rotational shaft TM8 by operation of the fourth clutch C4. Therefore, the compound planetary gear set CPG1 form a third shift line SP3 and D3 is output through the seventh rotational shaft TM7.

[Fourth Forward Speed]

The second brake B2 that was operated at the third forward speed is released and the first brake B1 is operated at the fourth forward speed 4th.

As shown in FIG. 3, the first and second planetary gear sets PG1 and PG2 form the fourth forward speed lines T4-1 and T4-2 by operation of the second clutch C2 and the first brake B1, and corresponding rotation speed is input to the compound planetary gear set CPG through the fifth rotational shaft TM5.

In a state that the corresponding rotation speed is input to the fifth rotational shaft TM5, the rotation speed of the input shaft IS is input to the eighth rotational shaft TM8 by operation of the fourth clutch C4. Therefore, the compound planetary gear set CPG1 forms a fourth shift line SP4 and D4 is output through the seventh rotational shaft TM7.

[Fifth Forward Speed]

The first brake B1 that was operated at the fourth forward speed is released and the third clutch C3 is operated at the fifth forward speed 5th.

As shown in FIG. 3, the first and second planetary gear sets PG1 and PG2 and the compound planetary gear set CPG become direct-coupling states such that the first and second planetary gear sets PG1 and PG2 form the fifth forward speed lines T5-1 and T5-2 and the compound planetary gear set CPG forms a fifth shift line SP5. Therefore, D5 is output through the seventh rotational shaft TM7.

[Sixth Forward Speed]

The fourth clutch C4 that was operated at the fifth forward speed is released and the first brake B1 is operated at the sixth forward speed 6th.

As shown in FIG. 3, the first and second planetary gear sets PG1 and PG2 form the fourth forward speed lines T4-1 and T4-2 by operation of the second clutch C2 and the first brake B1, and corresponding rotation speed is output to the compound planetary gear set CPG through the fifth rotational shaft TM5.

In a state that the corresponding rotation speed is input to the fifth rotational shaft TM5, the rotation speed of the input shaft IS is input to the sixth rotational shaft TM6 by operation of the third clutch C3. Therefore, the compound planetary gear set CPG1 forms a sixth shift line SP6 and D6 is output through the seventh rotational shaft TM7.

[Seventh Forward Speed]

The first brake B1 that was operated at the sixth forward speed is released and the second brake B2 is operated at the seventh forward speed 7th.

As shown in FIG. 3, the first and second planetary gear sets PG1 and PG2 form the third forward speed lines T3-1 and T3-2 by operation of the second clutch C2 and the second brake B2, and corresponding rotation speed is input to the compound planetary gear set CPG through the fifth rotational shaft TM5.

In a state that the corresponding rotation speed is input to the fifth rotational shaft TM5, the rotation speed of the input shaft IS is input to the sixth rotational shaft TM6 by operation of the third clutch C3. Therefore, the compound planetary gear set CPG1 forms a seventh shift line SP7 and D7 is output through the seventh rotational shaft TM7.

[Eighth Forward Speed]

The second clutch C2 that was operated at the seventh forward speed is released and the first brake B1 is operated at the eighth forward speed 8th.

As shown in FIG. 3, the first and second planetary gear sets PG1 and PG2 form the second forward speed lines T2-1 and T2-2 by operation of the first and second brakes B1 and B2, and all the rotational elements of the second planetary gear set PG2 are fixed.

In a state that the fifth rotational shaft TM5 is fixed, the rotation speed of the input shaft IS is input to the sixth rotational shaft TM6 by operation of the third clutch C3. Therefore, the compound planetary gear set CPG1 forms an eighth shift line SP8 and D8 is output through the seventh rotational shaft TM7.

[Ninth Forward Speed]

The first brake B1 that was operated at the eighth forward speed is released and the first clutch C1 is operated at the ninth forward speed 9th.

As shown in FIG. 3, the first and second planetary gear sets PG1 and PG2 form the first forward speed lines T1-1 and T1-2 by operation of the first clutch C1 and the second brake B2, and corresponding rotation speed is input to the compound planetary gear set CPG through the fifth rotational shaft TM5.

In a state that the corresponding rotation speed is input to the fifth rotational shaft TM5, the rotation speed of the input shaft IS is input to the sixth rotational shaft TM6 by operation of the third clutch C3. Therefore, the compound planetary gear set CPG1 forms a ninth shift line SP9 and D9 is output through the seventh rotational shaft TM7.

[Tenth Forward Speed]

The second brake B2 that was operated at the ninth forward speed is released and the first brake B1 is operated at the tenth forward speed 10th.

As shown in FIG. 3, the first and second planetary gear sets PG1 and PG2 form the sixth forward speed lines T6-1 and T6-2 by operation of the first clutch C1 and the first brake B1, and corresponding rotation speed is input to the compound planetary gear set CPG through the fifth rotational shaft TM5.

In a state that the corresponding rotation speed is input to the fifth rotational shaft TM5, the rotation speed of the input shaft IS is input to the sixth rotational shaft TM6 by operation of the third clutch C3. Therefore, the compound planetary gear set CPG1 forms a tenth shift line SP10 and D10 is output through the seventh rotational shaft TM7.

[Reverse Speed]

The first brake B1 and the first and fourth clutches C4 are operated at the reverse speed Rev.

As shown in FIG. 3, the first and second planetary gear sets PG1 and PG2 form the sixth forward speed lines T6-1 and T6-2 by operation of the first clutch C1 and the first brake B1, and corresponding rotation speed is input to the compound planetary gear set CPG through the fifth rotational shaft TM5.

In a state that the corresponding rotation speed is input to the fifth rotational shaft TM5, the rotation speed of the input shaft IS is input to the eighth rotational shaft TM8 by operation of the fourth clutch C4. Therefore, the compound planetary gear set CPG1 forms a reverse shift line RS and REV is output through the seventh rotational shaft TM7.

As described above, in the planetary gear train according to the exemplary embodiment of the present invention, four planetary gear sets PG1, PG2, PG3, and PG4 may implement ten forward speeds and one reverse speed through the operation-control of four clutches C1, C2, C3, and C4 and two brakes B1 and B2.

As a result, the planetary gear train according to the exemplary embodiment of the present invention may improve the power transmission efficiency and the fuel efficiency through achieving multiple gear stages.

In addition, three friction elements operate for each gear stage, and as a result, a friction drag loss is decreased by minimizing the number of friction elements which do not operate, thereby improving the power transmission efficiency and the fuel efficiency.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A planetary gear train of an automatic transmission for a vehicle comprising:
    an input shaft into which power of an engine is input;
    a first planetary gear set including a first sun gear, a first planetary carrier, and a first ring gear;
    a second planetary gear set including a second sun gear, a second planetary carrier, and a second ring gear;
    a third planetary gear set including a third sun gear, a third planetary carrier, and a third ring gear;
    a fourth planetary gear set including a fourth sun gear, a fourth planetary carrier, and a fourth ring gear;
    a first rotational shaft including the second sun gear and directly connected to the input shaft;
    a second rotational shaft including the second planet carrier;
    a third rotational shaft including the first planet carrier and the second ring gear and selectively connected to a transmission housing;
    a fourth rotational shaft including the first sun gear and selectively connected to the transmission housing or the second rotational shaft;
    a fifth rotational shaft including the first ring gear and the third ring gear and selectively connected to the second rotational shaft;
    a sixth rotational shaft including the third planet carrier and the fourth ring gear and selectively connected to the first rotational shaft;
    a seventh rotational shaft including the fourth planet carrier and directly connected to an output shaft;
    an eighth rotational shaft including the third sun gear and the fourth sun gear and selectively connected to the first rotational shaft;
    a first clutch selectively connecting the second rotational shaft with the fourth rotational shaft;
    a second clutch selectively connecting the second rotational shaft with the fifth rotational shaft;
    a third clutch selectively connecting the input shaft with the sixth rotational shaft;
    a fourth clutch selectively connecting the input shaft with the eighth rotational shaft;
    a first brake selectively connecting the fourth rotational shaft with the transmission housing; and
    a second brake selectively connecting the third rotational shaft with the transmission housing.

2. The planetary gear train of claim 1, wherein each of the first, second, third, and fourth planetary gear sets is a single pinion planetary gear set.

3. The planetary gear train of claim 2, wherein the first, second, third, and fourth planetary gear sets are sequentially disposed from the engine side.

4. The planetary gear train of claim 1, wherein a first forward speed is achieved by operating the second brake and the first and fourth clutches,
    a second forward speed is achieved by operating the first and second brakes and the fourth clutch,
    a third forward speed is achieved by operating the second brake and the second and fourth clutches, a fourth forward speed is achieved by operating the first brake and the second and fourth clutches,
a fifth forward speed is achieved by operating the second, third, and fourth clutches,
a sixth forward speed is achieved by operating the first brake and the second and third clutches,
a seventh forward speed is achieved by operating the second brake and the second and third clutches,
an eighth forward speed is achieved by operating the first and second brakes and the third clutch,
a ninth forward speed is achieved by operating the second brake and the first and third clutches,
a tenth forward speed is achieved by operating the first brake and the first and third clutches, and
a reverse speed is achieved by operating the first brake and the first and fourth clutches.

* * * * *